US009589468B2

(12) United States Patent
Gupta et al.

(10) Patent No.: US 9,589,468 B2
(45) **Date of Patent: *Mar. 7, 2017**

(54) SMART SPACING ALLOCATION

(71) Applicant: International Business Machines Corporation, Armonk, NY (US)

(72) Inventors: Rudranil D. Gupta, Kolkata (IN); Kaushik Lahiri, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,406

(22) Filed: Oct. 7, 2015

(65) Prior Publication Data

US 2016/0027302 A1 Jan. 28, 2016

Related U.S. Application Data

(63) Continuation of application No. 14/266,409, filed on Apr. 30, 2014, now Pat. No. 9,171,469, which is a (Continued)

(51) Int. Cl.

| | |
|---|---|
| ***G01G 1/14*** | (2006.01) |
| ***G08G 1/14*** | (2006.01) |
| ***G08G 1/16*** | (2006.01) |

(52) U.S. Cl.

CPC ............. *G08G 1/146* (2013.01); *G08G 1/145* (2013.01); *G08G 1/149* (2013.01); *G08G 1/168* (2013.01)

(58) Field of Classification Search

CPC ........ G08G 1/145; G08G 1/146; G08G 1/168; G08G 1/14; G01S 2015/933;

(Continued)

(56) References Cited

U.S. PATENT DOCUMENTS 4,603,390 A 7/1986 Mehdipour et al.
5,091,727 A 2/1992 Mahmood (Continued)

FOREIGN PATENT DOCUMENTS

GB 2 409 921 A 7/2005
WO WO 01/25048 A1 4/2001

(Continued)

OTHER PUBLICATIONS

"High Density Metro Parking the Missing Link in Public Transit:—Public Parking", NARPAC, Inc., http://www.narpac.org/METROPRK.HTM, pp. 1-18, last update Jun. 14, 2010.

(Continued)

*Primary Examiner* — Van Trieu

(74) *Attorney, Agent, or Firm* — Scully, Scott, Murphy & Presser, P.C.; David Adour, Esq.

(57) ABSTRACT

A method, system and computer program product for allocating parking spaces for vehicles in a parking area. In one embodiment, the invention provides a system comprising a sensor system for generating output representing measurements of vehicles in the parking area, a marking system for identifying parking spaces in the parking area, and a controller for calculating parking spaces for vehicles. The controller obtains defined measurements for the vehicles in the parking area, and calculates for each of the vehicles, a respective one parking space in the parking area. Embodiments of the invention dynamically allocate parking spaces based on: (1) Determining the minimum space that should be enough for the size of the car that is being currently identified for parking; and (2) Maximizing utilization of space by preventing improper fragmentation, where because of allocating fixed size spaces to all cars, big/small/medium, fragments of space would be wasted.

20 Claims, 6 Drawing Sheets

Related U.S. Application Data continuation of application No. 12/942,550, filed on Nov. 9, 2010, now Pat. No. 8,766,818.

(58) Field of Classification Search

CPC ......... G01S 2015/934; G01S 2015/936; B52D 15/027; B62D 15/0275; B62D 15/028; B62D 15/02852

See application file for complete search history.

(56) References Cited

U.S. PATENT DOCUMENTS

| | | | |
|---|---|---|---|
| 5,669,753 | A | 9/1997 | Schween |
| 5,758,547 | A | 6/1998 | Smale |
| 5,845,268 | A | 12/1998 | Moore |
| 5,943,726 | A | 8/1999 | Eitoku et al. |
| 6,340,935 | B1 | 1/2002 | Hall |
| 6,446,568 | B1 | 9/2002 | Hystad |
| 6,531,966 | B2 | 3/2003 | Krieger |
| 7,116,246 | B2 | 10/2006 | Winter et al. |
| 7,239,252 | B2 | 7/2007 | Kato |
| 7,312,722 | B2 | 12/2007 | Tillotson et al. |
| 7,660,205 | B2 | 2/2010 | Barth et al. |
| 8,050,963 | B2 | 11/2011 | Burdick |
| 8,289,189 | B2 | 10/2012 | Becker et al. |
| 8,766,818 | B2 | 7/2014 | Gupta et al. |
| 2006/0033641 | A1 | 2/2006 | Jaupitre et al. |
| 2006/0139181 | A1 | 6/2006 | Danz et al. |
| 2010/0017084 | A1 | 1/2010 | Riegel |
| 2011/0298926 | A1 | 12/2011 | Katsunaga et al. |
| 2012/0112929 | A1 | 5/2012 | Gupta et al. |
| 2014/0232562 | A1 | 8/2014 | Gupta et al. |

FOREIGN PATENT DOCUMENTS

| | | | |
|---|---|---|---|
| WO | WO 2004/084145 | A2 | 9/2004 |
| WO | WO 2005/066438 | A2 | 11/2010 |

OTHER PUBLICATIONS

Hanlon, "The coming of the Automated Parking Garage", gizmag 2003-2010, http://www.gizmag.com/go/6848; pp. 1-4, last update Jun. 14, 2010.

Smith et al., "Advanced Parking Systems (APS)", pp. 1-10, last updated Jul. 29, 2003.

Bingle et al., Abstract of: "Designing the optimal placement of spaces in a parking lot", Mathematical Modeling, vol. 9, Issue 10, 1987, pp. 1-2, available online Mar. 27, 2002, http://www.sciencedirect.com/science?_ob=ArticleURL&_udi=B6X1M-45FJWY1-1T&_user=10 . . . , last printed Nov. 9, 2010.

Maruti Swift —Specifications Petrol, http://www.marutiswift.com/specificationpetrol.aspx, p. 1 0f 1, last printed Jun. 14, 2010.

Honda City, Explore City, pp. 1-2, http://www.hondacarindia.com/city/specifications.aspx, last printed Jun. 14, 2010.

Tata Safari, pp. 1-2, http://www.safaridicor.com/specifications/specifications.asp, last printed Jun. 14, 2010.

Non-Final Office action dated Apr. 10, 2013 for U.S. Appl. No. 12/942,550.

Amendment dated Jul. 3, 2013 in response to Non-final Office Action dated Apr. 10, 2013 for U.S. Appl. No. 12/942,550.

Final Office action dated Oct. 4, 2013 for U.S. Appl. No. 12/942,550.

Amendment and Response entered with Filing of RCE dated Dec. 10, 2013 in response to Final Office Action dated Oct. 4, 2013 for U.S. Appl. No. 12/942,550.

Notice of Allowance dated Feb. 19, 2014 for U.S. Appl. No. 12/942,550.

Notice of Allowance dated Jun. 16, 2015 for U.S. Appl. No. 14/266,409.

CASE 1: DEFINING THE UNUTILIZED SPACES
(WITHOUT CHANGING PARKED AREA OF THE CAR)

| | CAR LENGTH | CAR BREADTH | PERCENTAGE (%) | ACTUAL NUMBER | PARKING BUFFER (LENGTH) | PARKING BUFFER (BREADTH) | UNIT SPACE USAGE | TOTAL SPACE USAGE |
|---|---|---|---|---|---|---|---|---|
| VERY LARGE CARS (e.g. SUV) | 15.25 | 6.3 | 10 | 10 | 1.5 | 0.5 | 113.9 | 1139 |
| LARGE SIZED CARS | 14.5 | 5.56 | 20 | 20 | 1.5 | 0.5 | 96.96 | 1939.2 |
| MEDIUM SIZED CARS | 12.1 | 5.5 | 70 | 70 | 1.5 | 0.5 | 81.6 | 5712 |
| PARKING LOT STANDARD SIZE (INCLUDES PARKING BUFFER) | 17 | 9 | 100 | 100 | 0 | 0 | 153 | 15300 |

| | |
|---|---|
| TOTAL NUMBERS OF CARS | 100 |
| TOTAL SPACE IN PARKING LOT | 15300 |
| ACTUAL SPACE USAGE BY CARS | 8790.2 |
| TOTAL WASTAGE | 6509.8 |
| PCT. WASTAGE (%) | 42.55 |

NOTE: ALL MEASUREMENTS ARE IN FEET.

FIG. 5

SMART SPACING ALLOCATION

CROSS-REFERENCE TO RELATED APPLICATION

This application is a continuation application of copending U.S. patent application Ser. No. 14/266,409, filed Apr. 30, 2014, now U.S. Pat. No. 9,171,469, issued Oct. 27, 2015, which is a continuation application of U.S. Pat. application Ser. No. 12/942,550, filed Nov. 9, 2010, now U.S. Pat. No. 8,766,818, issued Jul. 1, 2014. The entire contents and disclosures of U.S. patent applications Ser. Nos. 14/266,409 and 12/942,550 are hereby incorporated herein by reference.

BACKGROUND

This invention generally relates to parking vehicles, and more specifically, to allocating parking spaces to vehicles.

Automobiles and other vehicles are widely used to transport people and cargo. Indeed, many people live and work in places that, as a practical matter, are accessible only by car and other motor vehicles. Due to the very widespread use of vehicles, parking is needed for vehicles at many places where people may go to visit or to work, such as office building, entertainment venues, schools, businesses, shopping malls and airports. Parking is generally provided at these places in the form of a parking area or parking garage. Some streets also have parking areas, typically in the form of parking spaces along the sides of the streets. These parking facilities can be of varying sizes, ranging from a few parking spaces to thousands of spaces.

Parking facilities typically use space very inefficiently. Almost all of these facilities are designed to accommodate many types of vehicles and many vehicle sizes. Usually, most parking spaces in a facility are designed to accommodate the largest vehicle that, as a practical matter, would use that space. As a result, much space is wasted when smaller vehicles are parked in the parking spaces.

A parking lot may be defined as a set of parking spaces. A parking space, usually a rectangle, has a length and a breadth. At present, the length and breadth are fixed for all parking spaces inside a particular parking facility. This is true for virtually all parking facilities.

There are significant problems of such a concept. One important problem is that car sizes are non-standard, while parking spaces are all of the same size inside a particular parking lot. Also, large cars have a tight fit parking, while smaller cars have a lot of empty space around them which is usually wasted. Another problem is that a parking lot is declared full when all parking spaces are occupied, even when there are wasted empty spaces.

The inefficient use of parking facilities results in cost overhead to two parties—the parking lot owner loses revenue, and the car driver has to look for alternate space which indirectly causes a loss of fuel and time. Pollution increases due to traffic congestion in multiple parking lots, where a single parking lot could have been a solution. Also, more city/town area is wasted in parking lots, when this area could be utilized for other purposes, such as a park or for recreation.

BRIEF SUMMARY

Embodiments of the invention provide a method, a system and a computer program product for allocating space for vehicles in a parking area. In one embodiment, the method comprises obtaining defined measurements for a vehicle in the parking area; calculating a parking space in the parking area for the vehicle using said defined measurements, including determining a size and a position for the parking space in the parking area; and marking the calculated parking space to facilitate driving the vehicle into said parking space.

In an embodiment, the defined measurements are obtained by measuring the vehicle in the parking area. In one embodiment, the defined measurements include a length and a width of the vehicle. In one embodiment, the parking area includes one or more sensors for measuring the vehicle.

In an embodiment, the method comprises the further step of identifying a buffer zone around or adjacent to the parking space to help drive a car into a parking space without bumping into other cars. An alarm may be generated when a vehicle enters the buffer zone for its parking space. As one example, an alarm starts ringing once the vehicle enter the said zone and keeps ringing until the vehicle is totally inside this zone, with no part of the vehicle crossing the border of the zone. In one embodiment, the parking space has a defined boundary, and the buffer zone is adjacent this defined boundary.

In one embodiment, the parking space is marked by illuminating a perimeter for the parking space. In an embodiment, this is done by using a light source to form an outline for the parking space.

In an embodiment, the parking space is marked by forming specified markings on the parking area to identify the location of the parking space, and these specified markings are removed after the vehicle is parked in the parking space. In one embodiment, the specified markings are removed after the vehicle is driven out of the parking space.

Embodiments of the invention dynamically allocate the parking spaces based on several criteria—

1) Determine the minimum space that should be enough for the size of the car that is being currently identified for parking;
2) Maximize utilization of space by preventing improper fragmentation (where because of allocating fixed size spaces to all cars, big/small/medium, fragments of space would be wasted; and
3) Alarm system for when the vehicle approaches the boundaries, an audible alarm is triggered to notify the driver.

In an embodiment of the invention, measurements are made using sensor devices which are outside the vehicle, in the parking area, and which can detect and measure approaching vehicles. These measurements are used to calculate the minimum appropriate parking space for the vehicle. Laser beams are used to demarcate the boundaries within which the vehicle should be parked, and alarms are used to alert the driver if the vehicle approaches/crosses the boundaries.

BRIEF DESCRIPTION OF THE SEVERAL VIEWS OF THE DRAWINGS

FIG. 5 is a table showing data used in an example of the present invention.

DETAILED DESCRIPTION

Figure 1:
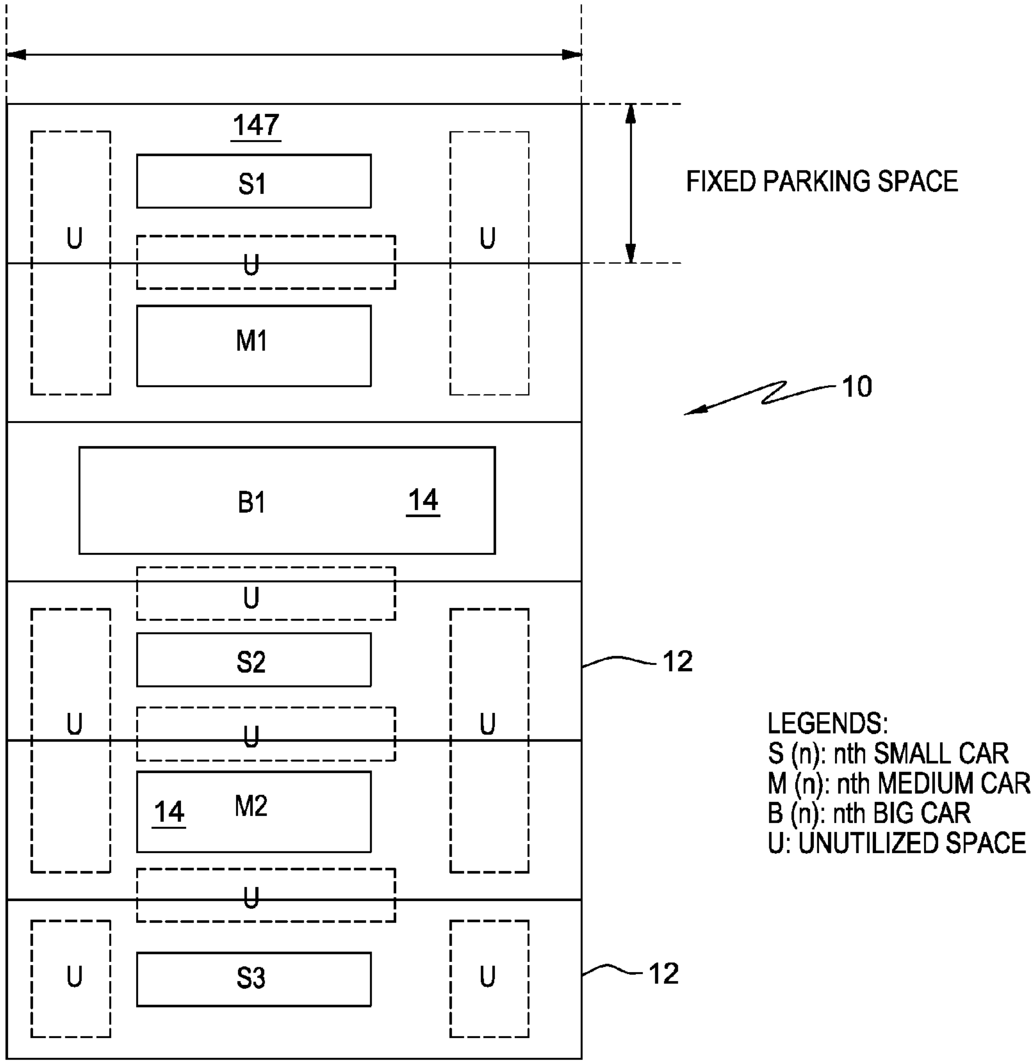
FIG. 1 illustrates how significant space is unutilized in a conventional parking area.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention allocates space for parking to vehicles in a parking area. In one embodiment, the invention provides a method comprising obtaining defined measurements for a vehicle in the parking area; calculating a parking space in the parking area for the vehicle using said defined measurements, including determining a size and a position for the parking space in the parking area; and marking the calculated parking space to facilitate driving the vehicle into said parking space.

Embodiments of the invention dynamically allocate the parking spaces based on several criteria—

1) Determine the minimum space that should be enough for the size of the car that is being currently identified for parking;
2) Maximize utilization of space by preventing improper fragmentation (where because of allocating fixed size spaces to all cars, big/small/medium, fragments of space would be wasted; and
3) Alarm system for when the vehicle approaches the boundaries, an audible alarm is triggered to notify the driver.

Consider the situation shown in FIG. 1. A parking area 10 has a fixed number of parking spaces 12, each of the same, fixed size. This area fits six vehicles 14; and if any of the vehicles is smaller than the maximum size for which the parking spaces are designed, which is the typical case, considerable space is wasted.

Figure 2:
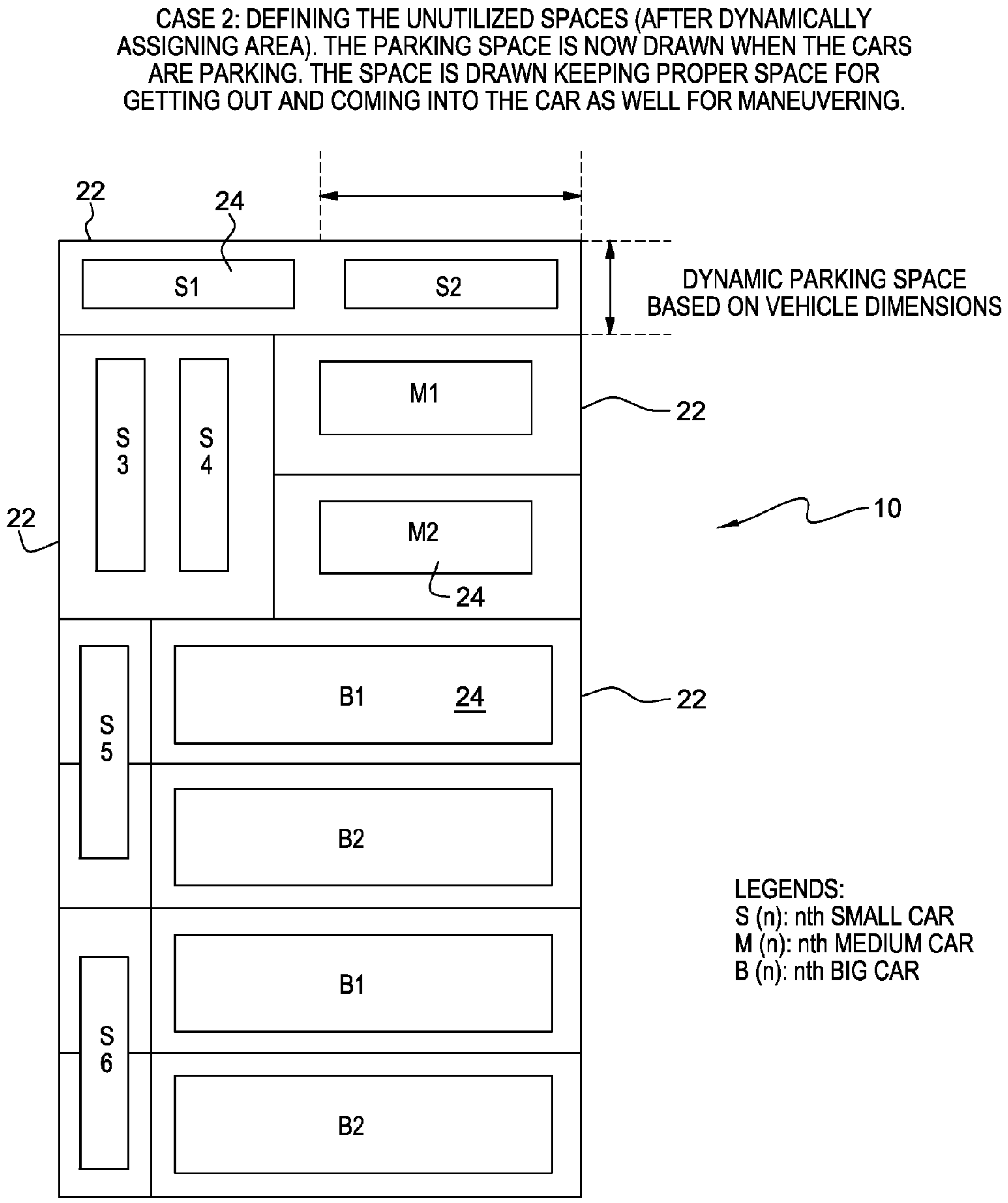
FIG. 2 illustrates how the unutilized space is dramatically decreased when an embodiment of the invention is used to assign parking space dynamically.

The arrangement of FIG. 1 can be compared with the arrangement shown in FIG. 2, which shows vehicles allocated spaces according to an embodiment of the invention. The individual parking spaces 22 are now drawn when the cars 24 are parking. The spaces are drawn keeping proper space for getting out and entering the car as well as for maneuvering. The same parking area 10 now fits twelve vehicles, four large size cars, two medium size cars, and six small cars.

Figure 3:
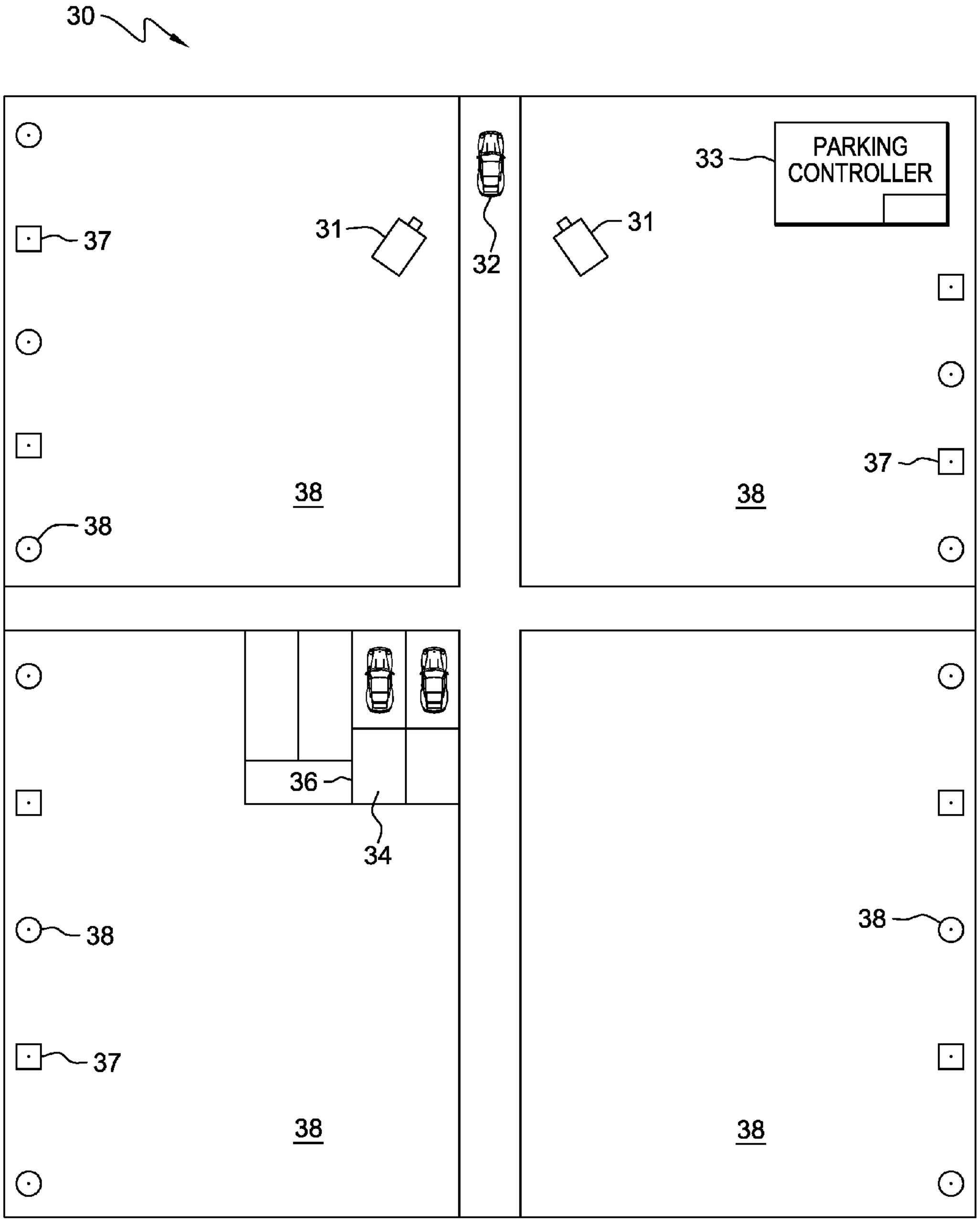
FIG. 3 shows a parking area in which an embodiment of the invention is used.

FIG. 3 illustrates a parking area or facility 30 that utilizes an embodiment of the invention. In this embodiment of the invention, measurements are made using sensor devices, represented at 31, which are outside the vehicle 32, in the parking area, and which can detect and measure approaching vehicles. These measurements are used, for example by a controller 33, to calculate the minimum appropriate parking space 34 for the vehicle. Laser beams are used to demarcate the boundaries 36 within which the vehicle should be parked, and alarms, represented at 37, are used to alert the driver if the vehicle approaches/crosses the boundaries. As one example, an alarm starts ringing once the vehicle approaches/crosses the boundaries of the zone and the alarm keeps ringing until the vehicle is totally inside this zone, with no part of the vehicle crossing the border of the zone.

Spaces 34 can be demarcated, for example, through the use of laser pointers 38 or other similar devices. There may be sensors 37 which would trigger alarms to the drivers when the cars approach near the boundaries drawn by the lasers to help the drivers park in the best possible manner. The devices used for drawing may be part of standard floor drawing laser apparatus. Examples are sensor lasers that are used in museums for preventing theft.

An individual pool 38 will have laser devices 31 fitted at strategic locations which can be on the ceiling or on the floor or in any other suitable location. As soon as a device detects the presence of a vehicle, vector oriented graphic drawing methods are used to calculate the vehicle boundaries and the laser beams are projected in such a way that the drivers are able to see a distinct boundary around the parking spaces where they are supposed to park. Procedures for using vector oriented drawing methods to project laser beams in a visually distinct manner are known in the art.

The main functionalities of the laser devices are:

(i) Determining its own parking jurisdiction area;

(ii) Detection of approaching vehicles;

(iii) Determining the optimal parking space and area for the vehicle to park; and (iv) Marking the optimal parking space by projecting laser beams around the boundary.

Various methods can be employed to simulate the above scenario. These methods include:

(i) Keeping laser devices on the ceiling of the parking lot to draw lines directly below;

(ii) Keeping a pair of sensors at the top and the bottom of a parking area which would detect the presence or absence of a vehicle by exchanging signals; and (iii) As soon as a vehicle enters the parking lot, the vehicle size is detected at the entrance and the optimal parking space for the vehicle is marked by the laser device, and then using a map guidance, the vehicle can be guided to the optimal parking space.

Figure 4:
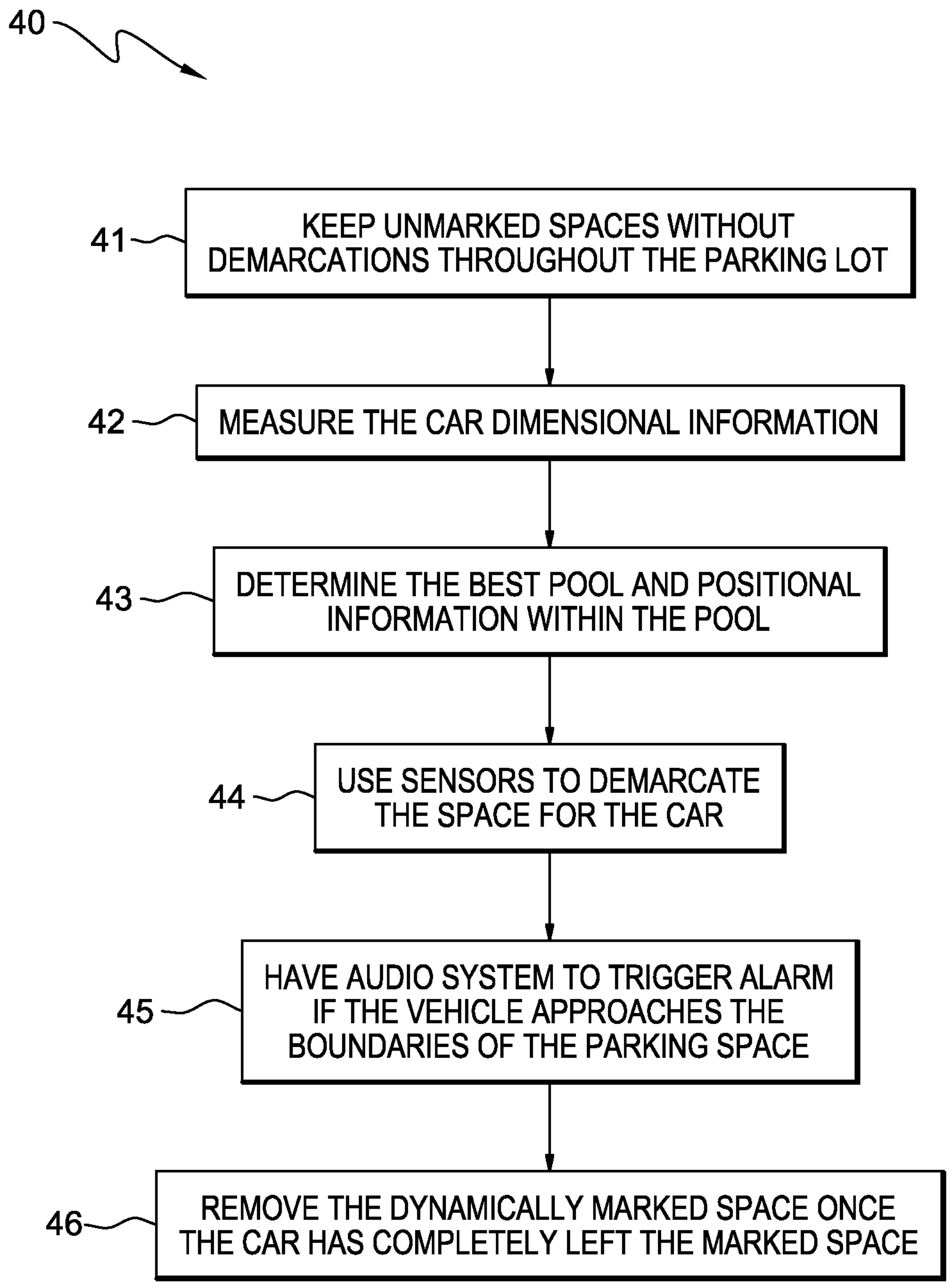
FIG. 4 illustrates an algorithm that may be used to implement an embodiment of the invention.

FIG. 4 shows, as an example, an algorithm 40 that may be used to implement embodiments of the invention.

As represented at 41, in an embodiment of the invention, unmarked spaces, without demarcations of fixed length and width, are kept throughout the parking lot. There will be areas, or pools, of such spaces of, for example, rectangular dimensions separated by corridors and driveways, as in a convention current parking lot, just without any specific markings for individual vehicles. At step 42, the car dimensional information is measured. In an embodiment, these measurements comprise the length and breadth of the car, and the measurements are made when the car enters the parking lot. These measurements allow a determination of the minimum area that is required for the car to park and for the passengers to open the doors and to come out of the car without colliding with or bumping into any other vehicle.

Step 43 is to determine the best pool, and positional information within that pool, for the car, where a parking space for the car can be allocated with minimal space wastage and fragmentation. At step 44, a space that was determined in step 43, is demarcated for the driver of the car to position the car in. This demarcation is done by drawing instruments, such as sensor lasers, in place in the parking lot. As represented at 45, an audio alarm system is in place in the parking lot that is triggered when the vehicle is approaching the boundaries of the demarcated parking space which has been drawn in step 44. At step 46, the dynamically marked space is removed once the car has completely left the space that was drawn for the car in step 44.

The following example shows a measure of the space savings that can be achieved using embodiments of the invention. This example uses some actual measurement figures from car web-sites and parking lots. Data used in this example are shown in FIG. 5.

For ease of calculation, the example uses three different categories of cars and one specific example for each category: (a) medium (Swift model car from Maruti Suzuki); (b) large (Honda City model car); and (c) very large (Tata Dicor SUV model car). This example, using measurement specifications from the corresponding car web-sites, shows that a saving of more than 42% can be achieved in a standard parking lot.

The standard size of a parking space is 17 ft by 9 ft (measured in standard parking lots). For the car sizes, a parking buffer space of 1.5 ft by 0.5 ft is added for the passengers to come out and for the car to keep headway with other neighboring cars in front and behind.

Consider 100 cars, where the space distribution is 70% medium cars, 20% large cars and 10% very large cars. The size chart is shown below as per the car technical specifications (all in feet).

| | Length | Breadth |
|---|---|---|
| Swift | 12.1 | 5.5 |
| Honda City | 14.5 | 5.56 |
| Tata Dicor | 15.25 | 6.3 |
| Parking Buffer | 1.5 | 0.5 |

Total space Used by 100 cars in earlier model (using standard parking space sizes)=100*17*9=15300 sq ft.

Total space Used by 70 medium cars in present model=70*({12.1+1.5}*{5.5+0.5}) =70*13.6*6=5712 sq ft.

Total space Used by 20 large cars in present model=20*({14.5+1.5}*{5.56+0.5}) =70*13.6*6=1939.2 sq ft.

Total space Used by 10 very large cars in present model=10*({15.25+1.5}*{6.3+0.5}) =70*13.6*6=1139 sq ft.

Total Space Saved=15300−(5712+1939.2+1139) =6509.8

% Savings=(6509.8/15300)*100=42.55%

Figure 6:
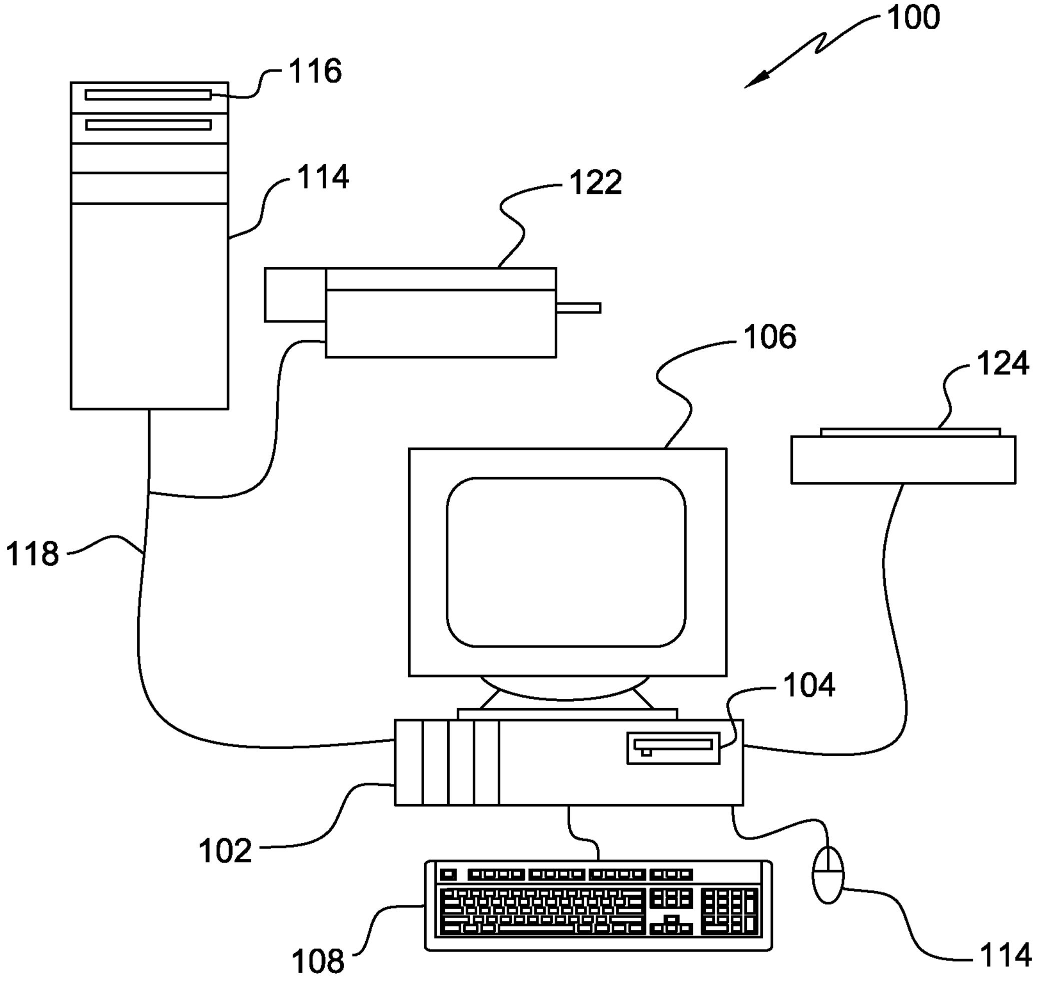
FIG. 6 depicts a computer system that may be used in the implementation of the present invention.

A computer-based system 100 in which a method embodiment of the invention may be carried out is depicted in FIG. 6. The computer-based system 100 includes a processing unit 110, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 150 and keyboard 160 are coupled to the processing unit 110, to provide user interaction. Scanner 180 and printer 170 are provided for document input and output. Printer 170 is shown coupled to the processing unit 110 via a network connection, but may be coupled directly to the processing unit. Scanner 180 is shown coupled to the processing unit 110 directly, but it should be understood that peripherals might be network coupled, or direct coupled without affecting the performance of the processing unit 110.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of determining a size and a location for a parking space in a defined parking lot for a vehicle, the parking lot having a plurality of pools of parking areas, the method comprising:

- measuring specified dimensional information about an identified vehicle;
- using the measured specified dimensional information to determine one of the pools, and positional information within said one of the pools, for the identified vehicle;
- forming markings in the one of the pools to mark a parking space in the one of the pools for the identified vehicle;
- triggering an alarm signal when the identified vehicle approaches the parking space;
- terminating the alarm signal when the identified vehicle is completely within the parking space; and
- removing said markings after the identified vehicle leaves the parking space.

2. The method according to claim 1, wherein the measuring specified dimensional information about an identified vehicle includes measuring the specified dimensional information when the identified vehicle enters the parking lot.

3. The method according to claim 1, wherein the forming markings to mark a parking space includes using lasers on a ceiling of the parking lot to draw lines to mark the parking space.

4. The method according to claim 1, further comprising using a map guidance to guide the identified vehicle to the parking space.

5. The method according to claim 1, wherein the using the measured specified dimensional information includes using the measured specified dimensional information to determine a size and a position for the parking space in the parking lot.

6. The method according to claim 1, wherein the using the measured specified dimensional information includes determining a defined minimum size for the identified vehicle.

7. The method according to claim 1, wherein the using the measured specified dimensional information to determine one of the pools, and positional information within said one of the pools, for the identified vehicle includes using one or more defined equations, including the specified dimensional information, to calculate specified dimensions for the parking space.

8. The method according to claim 7, wherein:

- the specified dimensional information include a length of the vehicle and the width of the vehicle; and
- the using one or more defined equations to calculate the given dimensions for the parking space includes calculating a length of the parking space by adding a first fixed amount to the length of the vehicle.

9. The method according to claim 8, wherein the using one or more defined equations to calculate the given dimensions for the parking space further includes calculating a width of the parking space by adding a second fixed amount to the width of the vehicle.

10. The method according to claim 1, wherein:

- the measuring specified dimensional information about an identified vehicle includes using vector oriented graphic drawings methods to calculate boundaries of the identified vehicle; and
- the using the measured specified dimensional information includes determining a minimum space for the identified vehicle and calculating a length and a width for the parking space.

11. A system for determining a size and a location for a parking space in a defined parking lot for a vehicle, the parking lot having a plurality of pools of parking areas, the system comprising:

- a sensor system for generating output representing measured specified dimensional information about an identified vehicle;
- a controller including one or more processor units for receiving the output from the sensor system, for using said output to determine one of the pools, and positional information within said one of the pools, for the identified vehicle;
- a marking system for forming markings in the one of the pools to mark a parking space in the one of the pools for the identified vehicle; and
- an alarm system for triggering an alarm signal when the identified vehicle approaches the parking space and for terminating the alarm signal when the identified vehicle is completely within the parking space; and
- wherein the marking system removes said markings after the identified vehicle leaves the parking space.

12. The system according to claim 11, wherein the specified dimensional information includes a length and a width for the vehicle.

13. The system according to claim 11, wherein the controller identifies a respective one buffer zone for each of the parking spaces.

14. The system according to claim 13, wherein:

each of the parking spaces has a defined boundary; and the buffer zone for the parking space is adjacent the defined boundary of the parking space.

15. The system according to claim 11, wherein the marking system includes a laser subsystem to outline the parking spaces with light beams.

16. An article of manufacture, comprising:

at least one tangible computer readable medium having computer readable program code logic to execute machine instructions in one or more processing units for determining a size and a location for a parking space in a defined parking lot for a vehicle, the parking lot having a plurality of pools of parking areas, said computer readable program code logic, when executing, performing the following:

receiving specified dimensional information about an identified vehicle;

using the specified dimensional information to determine one of the pools, and positional information within said one of the pools, for the identified vehicle;

forming markings in the one of the pools to mark a parking space in the one of the pools for the identified vehicle;

triggering an alarm signal when the identified vehicle approaches the parking space; and terminating the alarm signal when the identified vehicle is completely within the parking space; and removing said markings after the identified vehicle leaves the parking space.

17. The article of manufacture according to claim 16, wherein the receiving specified dimensional information about an identified vehicle includes receiving the specified dimensional information when the identified vehicle enters the parking lot.

18. The article of manufacture according to claim 16, wherein the forming markings to mark a parking space includes using lasers on a ceiling of the parking lot to draw lines to mark the parking space.

19. The article of manufacture according to claim 16, wherein the using the specified dimensional information includes using the specified dimensional information to determine a size and a position for the parking space in the parking lot.

20. The article of manufacture according to claim 16, wherein the using the measured specified dimensional information to determine one of the pools, and positional information within said one of the pools, for the identified vehicle includes using one or more defined equations, including the specified dimensional information, to calculate specified dimensions for the parking space.

* * * * *